US012745084B2

(12) United States Patent
Bendiabdallah et al.

(10) Patent No.: US 12,745,084 B2
(45) Date of Patent: Sep. 22, 2026

(54) METHOD FOR MANAGING AN ELECTRONIC DEVICE REMOTELY

(71) Applicant: ORANGE, Issy-les-Moulineaux (FR)

(72) Inventors: Halim Bendiabdallah, Chatillon Cedex (FR); Elyass Najmi, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 275 days.

(21) Appl. No.: 18/574,473

(22) PCT Filed: Jun. 28, 2022

(86) PCT No.: PCT/FR2022/051285
§ 371 (c)(1),
(2) Date: Dec. 27, 2023

(87) PCT Pub. No.: WO2023/275484
PCT Pub. Date: Jan. 5, 2023

(65) Prior Publication Data
US 2024/0292220 A1 Aug. 29, 2024

(30) Foreign Application Priority Data
Jun. 29, 2021 (FR) ........................................ 2106965

(51) Int. Cl.
*H04W 12/08* (2021.01)

(52) U.S. Cl.
CPC ..................................... *H04W 12/08* (2013.01)

(58) Field of Classification Search
CPC ....... G06F 21/34; G06F 21/44; H04L 63/101; H04W 12/08; H04W 12/63; H04W 12/71; H04W 4/80
See application file for complete search history.

(56) References Cited

U.S. PATENT DOCUMENTS 9,294,800 B2 3/2016 McMahon et al.
10,027,842 B2 7/2018 Haba et al.
2008/0005432 A1 1/2008 Kagawa
2011/0273625 A1* 11/2011 McMahon ......... H04N 21/4227 348/734
(Continued)

FOREIGN PATENT DOCUMENTS

WO 2019160265 A1 8/2019

OTHER PUBLICATIONS

English translation of the Written Opinion of the International Searching Authority dated Oct. 13, 2022 for corresponding International Application No. PCT/FR2022/051285, filed Jun. 28, 2022.
(Continued)

*Primary Examiner* — Nader Bolourchi
(74) *Attorney, Agent, or Firm* — David D. Brush; Westman, Champlin & Koehler, P.A.

(57) ABSTRACT

A method for managing an electronic device configured to communicate with at least one user terminal and with at least one server. The method is implemented by the server and includes: receiving, from the electronic device, a request to identify at least one user terminal for managing the electronic device; and transmitting, to the at least one identified user terminal, a notification request allowing a managing application on the at least one identified user terminal to be activated.

10 Claims, 2 Drawing Sheets

(56) References Cited

U.S. PATENT DOCUMENTS

2019/0259374 A1 * 8/2019 Kwon .................. H04W 12/06

OTHER PUBLICATIONS

International Search Report dated Oct. 13, 2022 for corresponding International Application No. PCT/FR2022/051285, filed Jun. 28, 2022.

Written Opinion of the International Searching Authority dated Oct. 13, 2022 for corresponding International Application No. PCT/FR2022/051285, filed Jun. 28, 2022.

* cited by examiner

[Fig. 1]
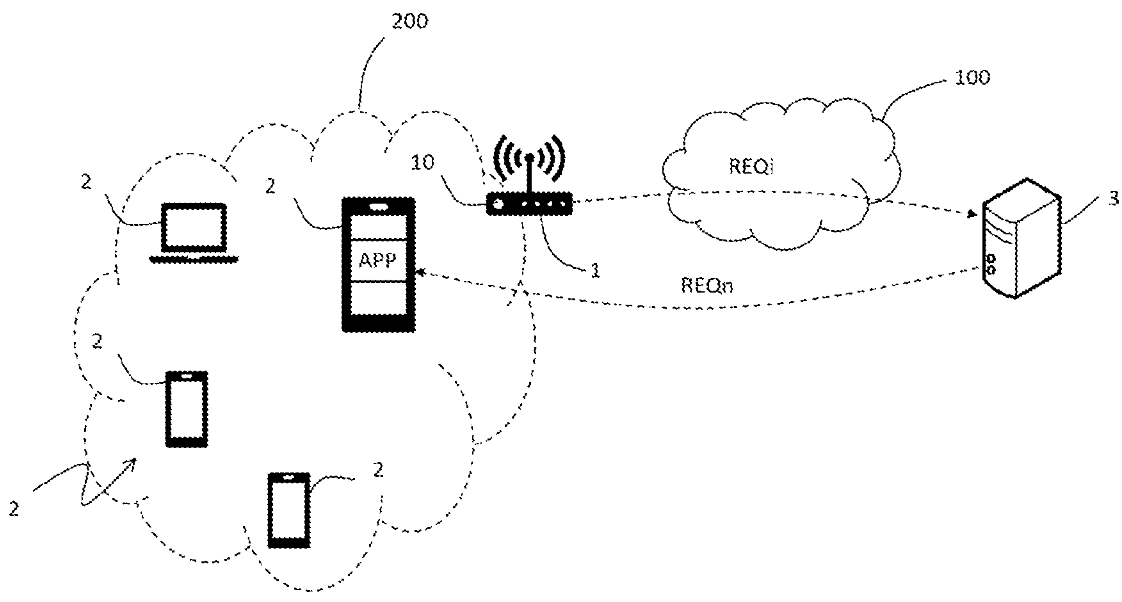
[Fig. 2]
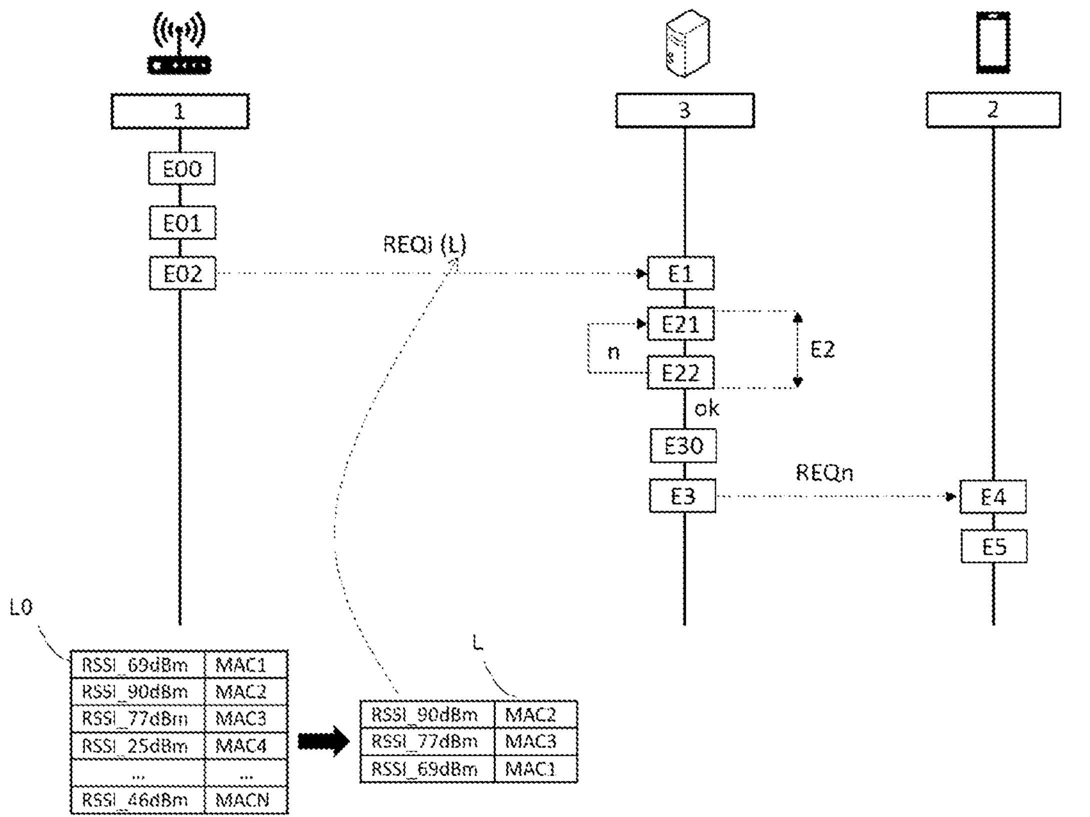

[Fig. 3a]
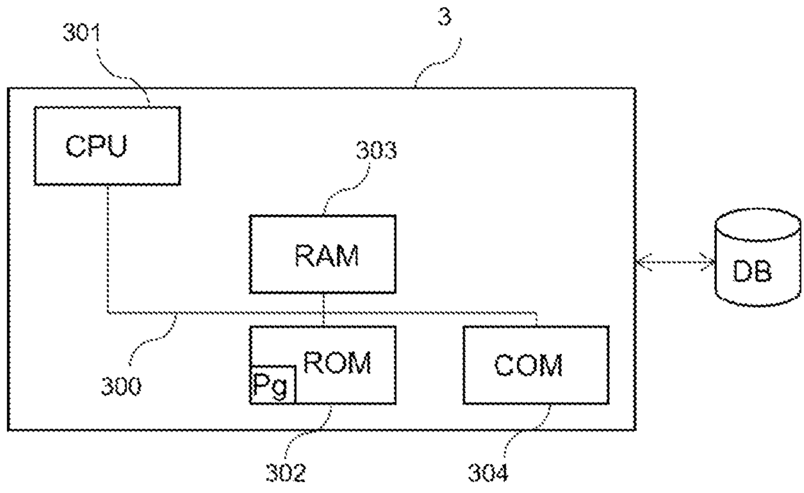
[Fig.3b]
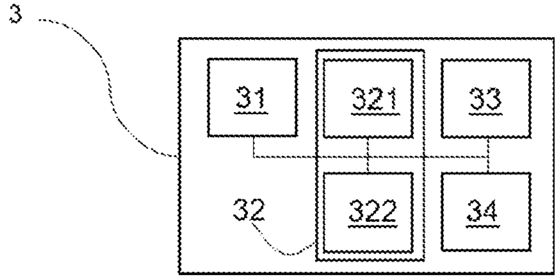

METHOD FOR MANAGING AN ELECTRONIC DEVICE REMOTELY

CROSS-REFERENCE TO RELATED APPLICATIONS

This application is a Section 371 National Stage Application of International Application No. PCT/FR2022/051285, filed Jun. 28, 2022, which is incorporated by reference in its entirety and published as WO 2023/275484 A1 on Jan. 5, 2023, not in English.

FIELD OF THE DISCLOSURE

The present disclosure relates to a method for managing an electronic device, such as a gateway allowing two communication networks to be connected.

It further relates to a server or equipment implementing the management method and an electronic device implementing a method for activating the management application.

The disclosure applies to any electronic device with functionalities that can be managed via a management application installed in another electronic device. For example, the disclosure applies to the management of a gateway, such as a home gateway or one used in a professional environment, via a management application installed on a user terminal.

BACKGROUND OF THE DISCLOSURE

Numerous electronic devices can be controlled by an application installed on a user terminal separate from the electronic device and able to communicate with the electronic device. This application allows easy management of the electronic device, notably when said device has a small human-machine interface, without a screen or with a small screen. Furthermore, the application can propose numerous additional functionalities compared to those proposed by the human-machine interface of the electronic device.

A communication network access point device, like a gateway, such as a home gateway or one used in a professional environment, or “Box” between a private network and a public network, such as the Internet, is an example of an electronic device that generally has a small human-machine interface. Indeed, since gateways are increasingly miniaturized and their design is increasingly refined, they are very often managed by an application installed on a user terminal able to communicate with the gateway.

Electronic devices exist, such as gateways, comprising means for activating the management application on a user terminal. These activation means can comprise a button that a user can interact with in order to activate the application on their communication terminal. For example, the user can press a push button or place a conductive element (for example, their finger) on a touch button, with this action causing the generation and transmission of a request intended to activate the application on the user terminal.

Upon receiving the request on the user terminal, the application can be activated.

In order to determine the user terminal to which the request must be transmitted, the gateway further comprises means for detecting or identifying the terminal of the user that has interacted with the gateway. The terminal of the user that has interacted with the gateway is considered to correspond to the user terminal on which the gateway management application is installed and that the user wishes to use in order to manage the functionalities of the gateway.

For example, the electronic device can comprise near-field communication means, for example, of the NFC (Near-Field Communication) type intended to identify the user terminal that is located a short distance away, typically at a distance of a few centimeters.

The user, before or after performing an action on the electronic device that is intended to activate the application, approaches their terminal for communicating with the electronic device so that they can be identified by the electronic device.

The presence of the means for detecting or identifying the user terminal adds complexity and expense to the manufacture of the electronic device, which is, as indicated above, contrary to the current trend to simplify certain electronic devices, such as gateways.

Furthermore, the user terminal also needs to be equipped with near-field communication means of the same type, whether they are activated on the user terminal, and the user of the terminal positions the terminal so that it can be identified by the electronic device.

SUMMARY

The aim of an exemplary aspect of the present disclosure is to improve this situation and to propose a method for managing an electronic device allowing an application to be activated on a terminal of a user, improving the experience of the user.

To this end, according to a first aspect, the disclosure relates to a method for managing an electronic device configured to communicate with at least one user terminal and at least one server.

According to an aspect of the disclosure, the management method is implemented by the server and comprises:

- receiving, from the electronic device, a request to identify at least one user terminal;
- transmitting, to at least one identified user terminal, a notification request allowing a management application to be activated on said at least one identified user terminal.

Since the identification of the terminal is implemented by a server outside the electronic device, the addition of specific modules intended to identify the user terminal to which the notification request must be transmitted is not necessary. Furthermore, the identification of the communication terminal is implemented without the user of the terminal having to carry out an action dedicated to the identification or the detection of their communication terminal. The experience of the user (known as “client experience”) when using the electronic device is significantly improved.

The server, in response to receiving a request to identify at least one user terminal on which the application for managing the electronic device is to be activated, sends a notification request to said at least one identified user terminal, with this notification request allowing the management application to be activated on said at least one identified user terminal. In other words, the notification request is configured to activate, or to allow activation of, the management application on said at least one identified user terminal.

The user can then manage the operation of the management device from their user terminal via the management application.

According to one feature, the reception of the identification request is implemented in response to an interaction on said electronic device by a user.

Thus, the activation of the management application on the terminal is implemented following a request from the user of a terminal, with this request assuming the form of an interaction with the electronic device. This interaction can involve performing an action on a button of the electronic device. It follows that the user provided with their terminal is located in the vicinity of the electronic device.

According to one feature, the management method further comprises receiving, from the electronic device, a list of user terminals connected to the electronic device, with said at least one user terminal being identified from the received list of user terminals.

Thus, the server identifies at least one user terminal to which the request to identify the application is to be transmitted, from among the user terminals connected to the electronic device, with these user terminals being listed in the received list of terminals.

It should be noted that several user terminals of the list of users can be identified and can receive the notification request.

In one embodiment, the identification request received by the server comprises said list of terminals. In another embodiment, the list of user terminals is received in a message different from the identification request. In this embodiment, the list of terminals can be requested by the server upon receiving the identification request.

According to one feature, the list of user terminals is generated by said electronic device from a preliminary list comprising identifiers of user terminals connected to the electronic device, with each terminal identifier being associated with information representing the level of a signal received by the electronic device from said user terminal.

Thus, the preliminary list lists the user terminals connected to the electronic device. For each user terminal connected to the electronic device, the preliminary list comprises a pair formed by the identifier of the user terminal and information representing the level of a signal received by the electronic device from the terminal.

It should be noted that the number of pairs of this preliminary list corresponds to the number of user terminals connected to the electronic device.

It also should be noted that the information representing the level of a signal received by the electronic device from the user terminal provides information relating to the distance between the electronic device and the user terminal. It should be noted that for similar signal transmission levels, the more the information represents a high signal level, the closer the user terminal is to the electronic device.

According to one embodiment, the received list of user terminals comprises a sub-set of terminals of the preliminary list, with the list of terminals comprising, for each user terminal, the identifier of the user terminal and the information representing the signal level received by the device from the user terminal.

The server thus receives a list of user terminals, with each user terminal being associated with a value of a parameter representing the distance between the user terminal and the electronic device.

In this embodiment, identifying comprises determining at least one user terminal associated with the minimum value from among the values represented by the information representing the received signal level.

Determining the minimum value from among the values respectively associated with the user terminals of the list of terminals allows the user terminal located closest to the device to be identified from among the terminals connected to the electronic device. Thus, in the event that several communication terminals connected to the electronic device include the management application of the management device, the management method allows the user terminal that has interacted with the electronic device (user terminal located closest to the electronic device) to be identified and allows the notification request to be sent to the closest user terminal, instead of sending it to all the user terminals connected to the electronic device.

According to one embodiment, identifying comprises determining several user terminals that have respectively associated the minimum information values representing the received signal level. In this embodiment, several user terminals will receive the notification allowing the application to be activated, for example, the two terminals are located closest to the electronic device.

According to another embodiment, identifying can comprise determining user terminals associated with information representing the signal level with a value that is below a threshold value.

According to another embodiment, the received list of terminals comprises a sub-set of terminals of the preliminary list, with the identifiers of the terminals being ordered in descending order of the value represented by said information.

In this embodiment, the list of terminals is generated from the preliminary list, by extracting the identifiers from the terminals and ordering them as a function of the value of the associated parameter (representing the signal level) so as to obtain a list of identifiers in descending order of the values, i.e., for which the first identifier of the list corresponds to the highest value and the last identifier corresponds to the lowest value of the list of terminals.

In this embodiment, identifying comprises selecting the first terminal from the received list of terminals.

According to one embodiment, the number of entries for the preliminary list can be identical to the number of entries in the list of user terminals. In this embodiment, all the connected terminals are taken into account for generating the list of user terminals sent to the server.

According to another embodiment, as indicated above, the number of entries for the list of terminals can be less than that of the list of preliminary terminals. In this embodiment, when generating the list of terminals, a sub-set of identifiers is selected, with this sub-set of identifiers corresponding to the terminals for which the values represented by the associated information are the highest.

It should be noted that, in the embodiment in which the identifiers of the user terminals are ordered as a function of the values represented by the signal level information, this information can be absent from the received list of terminals. In other words, the list of terminals received by the server contains only the identifiers of the user terminals.

According to one feature, transmitting the notification request is preceded by verifying the authorization of said at least one identified user terminal for managing the operation of the electronic device.

According to one feature, verifying the authorization comprises polling a data table from an identifier of said at least one identified user terminal in order to verify the presence of the identifier in said data table.

This data table lists user terminals on which activation of the application for managing the electronic device is authorized.

This feature increments the security of the system implementing an aspect of the disclosure when only the user terminals that are preregistered as being authorized to manage the gateway can receive a request allowing the management application to be activated.

The features of the management method described above can be taken in isolation or in combination with one another.

According to a second aspect, the present disclosure relates to a method for activating an application for managing an electronic device, with the management application being installed on at least one user terminal. This activation method comprises transmitting a request to identify at least one user terminal to a server, with the transmission of the identification request being implemented in response to an interaction of a user with the electronic device.

The interaction of the user of a terminal with the electronic device triggers the implementation of the proposed management method. Indeed, following the interaction of the user with the terminal, the electronic device sends the server a request to identify at least one user terminal on which to activate the management application of the electronic device.

According to one feature, the activation method further comprises detecting user terminals connected to the electronic device, generating a list of user terminals comprising terminals connected to the electronic device and transmitting said list of terminals to the server.

The method for activating a management application of an electronic device is implemented by an electronic device, such as a gateway for accessing a communication network.

According to a third aspect, the present disclosure relates to a server configured to communicate with at least one electronic device and at least one user terminal, comprising:

a reception module configured to receive, from said electronic device, a request to identify at least one user terminal;

a transmission module configured to transmit, to at least one identified user terminal, a notification request allowing the management application to be activated on said at least one user terminal.

According to one feature, the server comprises an identification module configured to identify said at least one user terminal.

According to a fourth aspect, the present disclosure relates to an electronic device configured to communicate with a server and with at least one user terminal comprising an application for managing said electronic device, said electronic device comprising:

a transmission module configured to transmit a request to identify at least one user terminal to a server;

a module for interacting with a user configured to receive an action of the user, with the response to said action being the transmission of the request to identify said at least one user terminal.

According to a fifth aspect, the present disclosure relates to an access gateway allowing at least one user terminal to access a communication network, with said gateway comprising an electronic device according to the disclosure.

According to a sixth aspect, the present disclosure relates to a user terminal comprising an application for managing an electronic device according to the disclosure.

In particular, the user terminal comprises an application for managing at least one electronic device and is configured to receive, from a server, a notification request allowing said management application to be activated, with said notification request being transmitted by the server following the identification of said user terminal in response to the reception, from said at least one electronic device, of a request to identify at least one user terminal.

According to a seventh aspect, the present disclosure relates to a system comprising an electronic device, at least one user terminal comprising an application for managing the electronic device, and a server according to the disclosure.

According to an eighth aspect, the present disclosure relates to a computer program able to be implemented on a server, with the program comprising code instructions for implementing the steps of the management method according to the disclosure, when it is executed by a processor.

According to a ninth aspect, the present disclosure relates to a processor-readable information medium in a server, on which medium a computer program is stored comprising code instructions for implementing the steps of the management method according to the disclosure, when it is executed by the processor.

The method for activating a management application, the server, the electronic device, the gateway, the terminal, the system, the computer program and the information medium have features and advantages similar to those described above in relation to the management method.

Further features and advantages of the disclosure will become more clearly apparent from the following description.

BRIEF DESCRIPTION OF THE DRAWINGS

In the appended drawings, which are provided by way of non-limiting examples:

FIG. 1 illustrates the context for implementing the proposed technique;

FIG. 2 illustrates steps of the management method and of the method for activating an application according to one embodiment;

FIG. 3*a* illustrates a hardware architecture of a server that can implement the proposed management method; and FIG. 3*b* illustrates a functional representation of a server that can implement the proposed management method.

DETAILED DESCRIPTION OF ILLUSTRATIVE EMBODIMENTS

The disclosure applies to any equipment or electronic device whose operation can be managed via an application installed on another equipment or electronic device. It particularly applies to a gateway for accessing a communication network managed via an application installed on a user terminal.

FIG. 1 illustrates the applicable context of an exemplary aspect of the present disclosure. In particular, this figure illustrates a system comprising an electronic device 1, a set of user terminals 2 and a server 3. The electronic device 1 is an access point device or gateway allowing user terminals to access a wide area communications network 100 or WAN-type network ("Wide Area Network"), such as the Internet. The set of terminals 2 forms a local area network 200 or LAN-type network ("Local Area Network") with the gateway 1, such as a home network or company network.

In the example shown, the set of terminals 2 comprises several mobile telephone terminals and a portable computer. It should be noted that, in FIG. 1, the set of terminals, as well as each terminal, has the same digital reference 2. The number and the type of user terminals can be different. For example, the set of terminals can comprise other types of user terminals, for example, a tablet, a television, a games console or the like.

The terminals 2 and the gateway 1 are configured to communicate with each other according to wireless communication standards such as Wi-Fi, Bluetooth or the like. For example, they use the IP (Internet Protocol) protocol for communicating with each other and for communicating with the wide area communication network 100, in particular with the server 3.

The server 3 is configured to exchange messages with the gateway 1 and comprises the modules required for implementing the proposed method for managing the gateway.

According to one embodiment, the server 3 is a notification server (or "Push" server). This type of server is responsible for sending notifications relating to the applications installed on the user terminals.

The aforementioned equipment will be described in detail with reference to FIGS. 3*a* and 3*b*.

The gateway 1 is further configured to allow the user terminals 2 to exchange messages with servers in the wide area network 100, in order to, for example, access services proposed by its servers, such as access to audio or video content, electronic messages or websites.

At least one communication terminal 2 of the set of terminals comprises a management application APP intended for managing the gateway 1. The management application can be activated by the user of the user terminal interacting with the gateway. To this end, the human-machine interface of the gateway 1 is configured to receive an action of the user, with this action resulting in the activation of the gateway management application on a user terminal 2.

It should be noted that the terms terminal, user terminal and communication terminal are used interchangeably in this document and refer to the same equipment.

In one embodiment, the gateway comprises a button 10 in the human-machine interface dedicated to activating the application on a communication terminal. Of course, the button can be used for functions other than activating the management application.

By way of a non-limiting example, the button can be a push button, with the action of the user involving pressing this button. According to another example, the button can be a touch type button, with the action of the user involving placing a conductive element, such as their finger, on the button. The term "activation of the application" is understood to mean displaying the application on the screen of the user terminal.

According to one embodiment, the application is displayed on at least part of the screen of the user terminal without any action by the user on their terminal. For example, the application can be displayed on a window generated for displaying the application.

According to another embodiment, activation of the application follows an action by the user on their terminal. For example, after the user acts on the button 10 of the gateway, a window is displayed on the screen of the user terminal, such as a pop-up window, with the user being able to act on the pop-up window in order to display the management application on the screen of their terminal.

In some embodiments, the pop-up window can indicate that an event has occurred on the gateway. For example, a malfunction or a failure has occurred, or a functionality has been deactivated. The user terminal can thus receive a notification allowing a service to be executed that depends on the event that has occurred on the gateway. For example, the notification can contain means for accessing the service, such as a URL address allowing an action to be implemented on the gateway (for example, in order to resolve a malfunction).

For example, this notification can be displayed on a pop-up window, on the application directly or can assume the form of an SMS or of any other notification intended for the user of the terminal 1 (for example, an email). Furthermore, the pop-up window can propose a service to the user that is to be carried out as a function of the event that has occurred. For example, the window can comprise a URL address.

In another embodiment, the management application can be displayed in a heading of the application corresponding to a service to be implemented as a function of the event that has occurred in the gateway.

In these embodiments, the gateway can be configured to detect an event that has occurred on the gateway. Thus, for example, a user can press the button 10 of the gateway in order to launch the application APP on their terminal 2 with the aim of resolving a problem or malfunction that has occurred on the gateway. According to one embodiment, the application can be activated on the screen (for example, on a pop-up window) on the appropriate heading in order to resolve the problem that has occurred on the gateway.

It should be noted that the interaction of the user of the communication terminal with the gateway triggers the implementation of the management method. This management method will be described with reference to FIG. 2.

As is common practice today, the application that is intended to control an electronic device, or the management application APP, can be installed on several terminals. The terminals authorized to control the electronic device are listed in a data table. This data table is stored, for example, by a server, such as the notification server 2. The data table can be stored in another equipment, for example, in a server different from the notification server 2 or in the gateway 1.

The terminals that can manage the application APP can belong to the same user or to different users.

FIG. 2 illustrates steps of the method for managing an electronic device 1 according to one embodiment.

In the embodiment described, the electronic device 1 is a home gateway, but, of course, as indicated above, the disclosure applies to any other type of electronic device whose operation can be managed via an application installed in another electronic device, such as a user terminal or communication terminal 2.

As indicated above, the management method is initiated by an action E00 of the user on the gateway. This action involves, for example, pressing the button 10 on the gateway 1.

In response to the interaction E00 of the user of the communication terminal on the gateway 1, the gateway generates an identification request REQi intended to command the server 3 to identify the communication terminal 2 on which the management application APP is to be activated. This identification request REQi is sent to the server 3. This server 3 can be a notification server. It should be noted that, in response to the interaction E00 of the user, implementation of the management method is triggered.

In another embodiment, the server is a server different from the notification server. It should be noted that the steps of the management method can be implemented by a server or distributed over several servers.

In one embodiment, the request REQi to identify at least one user terminal 2 comprises a list L of terminals connected to the gateway 1.

In this embodiment, this list L of terminals connected to the gateway is generated by the gateway 1. In a known manner, a gateway is configured to identify the equipment connected thereto, for example, using Wi-Fi technology. Furthermore, the gateway 1, like the communication terminals 2, is configured to determine the level (strength) of the signals received from the respectively connected equipment.

Thus, in one embodiment, the gateway is configured to generate a list of terminals, called preliminary list L0 of terminals, comprising the identifiers of the communication terminals connected to the gateway. In this preliminary list L0, the level of the signal received by each communication terminal is associated with each communication terminal on the list.

It should be noted that the preliminary list L0 of terminals comprises pairs, with each pair associating a terminal identifier and information representing the level of the signal received by the gateway from this terminal. In other words, a pair of the preliminary list L0 of terminals comprises a terminal identifier and information representing the level of the signal received by the gateway, in particular by the antenna of the gateway. The reception signal level or the level of strength of the reception signal is referred to as the "Received Signal Strength Indication" or RSSI.

A pair formed by a terminal Identifier and information representing the level of the signal received by the gateway is called the "identifier-RSSI pair" in this document.

The preliminary list L0 of terminals and the list L of terminals assume the form of a data table comprising two columns and as many rows as there are terminals (FIG. 2) in the list.

It should be noted that, for terminals with transmitters transmitting with the same order of transmission strength levels, the level of the signal received by the gateway 1 from a communication terminal 2 constitutes distance information representing the distance between the gateway 1 and the communication terminal 2. Indeed, the closer the communication terminal is to the gateway, the higher the level of the received signal. When the communication terminal 2 is located next to the gateway 1, the strength of the received signal or the level of the received signal is higher (it is the maximum permissible level).

The identifier of the terminal is a character string uniquely identifying the terminal. For example, the identifier of the communication terminal can be the MAC ("Media Access Control") address of the communication terminal. Other identifiers can be used, such as the IP address of the communication terminal or any other unique identifier.

The preliminary list L0 of terminals is stored in the gateway 1 and is continuously updated as a function of the terminals connecting to and disconnecting from the gateway 1.

In one embodiment, when the gateway receives an action of the user, such as pressing a button 10, the list L of terminals is generated E01 from the preliminary list L0 of terminals. For example, the list L of terminals comprises a sub-set of the "identifier-RSSI" pairs corresponding to the terminals with the highest RSSI from among the connected terminals. The number of terminals to be selected in order to form the sub-set or the number of terminals to be selected from among the terminals connected to the gateway (or terminals of the preliminary list L0) is predetermined. The number of selected terminals is a parameter that is stored in the server. The gateway selects the predetermined number of terminals and sends them to the server via the list L of terminals. Thus, in this embodiment, generating the list L of terminals comprises selecting a predetermined number of terminals from among the terminals of the preliminary list L0 of connected terminals.

For example, generating the list of terminals comprises selecting the terminals connected to the gateway located closest thereto. In other words, generating the list of terminals comprises selecting the terminals of the preliminary list L0 of terminals with the highest received signal level. In the embodiment shown, the three terminals with the highest reception level from among the terminals connected to the gateway (forming the preliminary list of terminals) are selected and form the list L of terminals.

In another embodiment, the list of terminals contains all the terminals of the preliminary list of terminals.

According to one embodiment, the gateway 1 generates a message containing the list L of terminals generated from the preliminary list L0 of terminals. This message can assume the form of a frame of the REST ("Representational State Transfer") type, such as a POST request.

By way of a non-limiting example, a POST request can assume the following form:

POST\Local_RSSI {{"RSSI": −77, "MAC": "7E: 33: 12: 01: 71: 16"},
{"RSSI": −69, "MAC": "7E: 1E: 33: 01: 5F: 10"},
{"RSSI": −90, "MAC": "3F: 44: 70: 06: 23: 13"}}

Where the "Local_RSSI" parameter corresponds to the name of the API ("Application Programming Interface") generating the levels of received signals and forming the activation request, and where the list of terminals comprises three terminals, the RSSI values of which are expressed in dBmW and are respectively associated with the MAC addresses of the terminals. In this example, the predetermined number of terminals is three. Of course, this number is provided by way of an illustration and can assume different values.

Of course, the name of the "Local_RSSI" API could assume any other alphanumeric form, i.e., use a different name. This parameter is intended to notify the server of the content of the request, namely a list of the signal levels or a list of RSSIs.

The message containing the list L of terminals (which in some embodiments is the identification request) can assume other forms. By way of a non-limiting example, it can be a request generated according to the MQTT ("Message Queuing Telemetry Transport") protocol, according to the TCP ("Transmission Control Protocol") protocol, or the like.

In one embodiment, such as the one shown in FIG. 2, generating the list of terminals further comprises classifying "identifier-RSSI" pairs in descending order of RSSI value. Thus, the generated list L of terminals, to be sent to the gateway, comprises connected terminals (three terminals in this example) ordered from the terminal with the highest RSSI value to the terminal with the lowest RSSI value (or, in other words, from the terminal located closest to the gateway to the terminal located furthest from the gateway).

The classification of the "identifier-RSSI" pairs can be implemented independently of the implementation of the selection of a predetermined number of the pairs.

By way of a non-limiting example, a POST request comprising the list of terminals in which the terminals have been ordered as a function of the RSSI value, can be as follows:

POST\Local_RSSI {{"RSSI": −90, "MAC": "3F: 44: 70: 06: 23: 13"}, {"RSSI": −77, "MAC": "7E: 33: 12: 01: 71: 16"}, {"RSSI": −69, "MAC": "7E: 1E: 33: 01: 5F: 10"}}

It should be noted that, in this request, the terminals are ordered from the terminal with the highest received signal level to the terminal with the lowest received signal level. It thus can be deduced that the terminals are ordered from the terminal located closest to the gateway to the terminal located furthest away.

In one embodiment, the request REQi to identify at least one user terminal comprises the list L of terminals. In this embodiment, when the user of a communication terminal interacts with the gateway, for example, by pressing the button 10, the request REQi to identify at least one user terminal is generated, with this request comprising a list L of terminals.

Once the identification request has been generated E01, it is sent E02 to a server 3, such as a notification server (or "Push" server). This type of server is responsible for sending notifications relating to the applications installed on the communication terminals.

When the server receives E1 the request REQi to identify at least one user terminal, it implements the identification E2 of the communication terminal 2 in which the management application APP must be activated.

During the identification step E2, the communication terminal 2 located closest to the gateway 2 is identified. This communication terminal 2 is considered to be identified and is associated with the user who interacted with the gateway, or, in other words, it is the communication terminal that the user will use to manage the functionalities of the gateway 1.

In some embodiments, the communication terminals located closest to the gateway 2 are identified. The identification of the communication terminal 2 to be notified is implemented from the list L of received terminals. As indicated below, in one embodiment, such as that illustrated in FIG. 2, the list L of terminals can be contained in the request REQi to identify at least one user terminal received in the reception step E1. In another embodiment, the list of terminals containing the list of terminals is a message that is received separately from the identification request (before or after the identification request).

In one embodiment, the POST type request containing the list of terminals corresponds to the request to identify at least one user terminal. In this embodiment, when the notification server receives the request containing the list of terminals, it considers this request to be a request to identify at least one user terminal, or, in other words, it considers the request to be a request from the gateway to identify the terminal on which the gateway management application is to be activated and for activating the management application in this identified communication terminal (the communication terminal of the user who interacted with the gateway).

According to one embodiment, the gateway implements the identification of the communication terminal 2 to be notified and sends its identifier to the server.

It should be noted that, in the embodiment illustrated in FIG. 2, the server 3 receives a list L of terminals containing terminals ordered in descending order of signal levels (as shown in FIG. 2).

In this embodiment, the list L of terminals contains "identifier-RSSI" pairs that are ordered in descending order of the signal level received by the gateway. In another embodiment, the list of terminals could only contain the terminal identifiers ordered in descending order of the signal level received by the gateway. Indeed, since the terminal identifiers are ordered, the RSSI does not need to be sent.

Once the server 3 receives E1 the list L of terminals, the list L of terminals is extracted and stored in the server 3. In this embodiment, identification E2 comprises selecting E21 the first terminal of the received list of terminals. Since this list L of terminals comprises the terminals ordered in descending order of the level of the received signal, the selected terminal corresponds to that which is located closest to the user.

Selection involves obtaining the identifier of the first terminal from the list L of terminals.

In this embodiment, identification further comprises a step of verifying the authorization of the selected communication terminal 2 for managing the operation of the gateway 1. This verification step E22 is intended to verify that the communication terminal 2 is authorized to manage the functionalities of the gateway 1 via the management application APP.

In one embodiment, verifying the authorization comprises polling a data table, from the identifier of the identified communication terminal.

The data table contains the identifiers of the terminals authorized to act on the operation of the gateway via the management application. In other words, the data table contains the identifiers of the terminals eligible to receive the notification allowing activation of the application. This data table is stored in a database that can be integrated into the notification server 3 or in a resource (not illustrated) outside the notification server 3.

This feature increments the security of the system implementing an aspect of the disclosure when only the terminals that are preregistered as being authorized to manage the gateway 1 can receive a request allowing the management application APP to be activated. Thus, a communication terminal comprising the gateway management application, located next to the gateway, will only receive the notification request if the identifier of the communication terminal is in the data table containing the identifiers of the terminals authorized to act on the operation of the gateway via the management application.

In one embodiment, the server 3 transmits a polling request to the database comprising the data table. This polling request comprises the identifier of the identified communication terminal 2 and is intended to verify whether the identifier of the identified terminal is present in the data table, i.e., if the identifier of the terminal is among the identifiers of the terminals authorized to act on the gateway via the management application.

If the identifier is present in the data table, meaning that the terminal 2 is authorized to manage the gateway 1 via the management application APP, the server generates E30 the notification request REQn and sends E3 it to the identified terminal.

The notification request REQn includes the identifier of the communication terminal 2 to be notified. In one embodiment, the communication terminal, upon reception E4 of the notification request, renders E51 a notification on the screen of the terminal, with this notification allowing the user to activate the application on the terminal. As indicated below, reception of the notification request can generate a pop-up window, containing the management application or a means allowing it to be opened, such as a link or URL address.

It should be noted that the client experience of this embodiment is highly satisfactory whenever the user can select the time they wish to activate the management application on their terminal.

In another embodiment, the management application is activated E52 upon reception of the notification request on the communication terminal. In this embodiment, the application is rendered on the screen of the terminal as soon as the request E4 is received.

It should be noted that, in the various embodiments, the notification request REQn allows the management application to be activated on the communication terminal receiving the notification.

Identification of the communication terminal 2 located closest to the gateway 1 allows the notification request to be transmitted only to this terminal (provided that it is authorized to receive this notification request), instead of being transmitted to any terminal connected to the gateway and including the management application. According to one embodiment, an identified terminal only receives the notification request if it is authorized to act on the gateway via the management application installed on the terminal.

According to one embodiment, if none of the communication terminals 2 present in the list L of terminals is in the data table containing the identifiers of the terminals authorized to act on the operation of the gateway via the management application, i.e., if no terminal of the list of received terminals is authorized to act on the gateway via the management application, the communication terminal of the user registered, or declared (for example, in the server), as being the administrator of the network formed by the gateway, is notified of the interaction of a user with the gateway. For example, the terminal of the user registered or declared as being the administrator, called administrator user terminal, receives the notification request REQn allowing activation of the gateway management application on this terminal. In another embodiment, the administrator user terminal is notified of the attempt of another user to act on the gateway via the management application.

When the list of terminals received by the server contains identifiers that have not been ordered according to the value of the level of the received signal, the management method can comprise a step of classifying the terminals of the list so as to order them in descending order of the signal level. The steps of identifying, generating and transmitting that are described below with reference to FIG. 2 are then implemented using the received list of terminals.

In another embodiment, in which the list of terminals received by the server contains identifiers that have not been ordered according to the value of the level of the received signal, the identification implemented by the server comprises a step of determining, from the received list of terminals, the communication terminal associated with the minimum value from among the values of the level of the signal received by the gateway.

Then, identification can comprise verifying the authorization of the terminal. If the terminal is authorized to manage the gateway, the server generates and transmits the notification request as described above.

It should be noted that, in some embodiments, the step of verifying the authorization is absent.

FIG. 3*a* schematically illustrates a hardware architecture of a server 3 that can implement the proposed management method. According to one embodiment, the server 3 can be a notification server.

The server 3 comprises a communication bus 300, to which the following are connected:

- a processing unit 301, called CPU ("Central Processing Unit") in the figure, which can comprise one or more processors;
- a non-volatile memory 202, for example, a ROM ("Read-Only Memory"), an EEPROM ("Electrically Erasable Programmable Read-Only Memory") or a Flash memory;
- a RAM 303 ("Random Access Memory"); and
- communication interfaces 304, called COM in the figure, adapted to exchange data, for example, with the communication terminal 2 and with the gateway 1.

The random-access memory 303 comprises registers adapted for storing the variables and parameters created and modified when executing a computer program comprising instructions for implementing the management method according to an aspect of the disclosure. The instruction codes of the program stored in the non-volatile memory 302 are loaded into the RAM 303 with a view to being executed by the processing unit CPU 301.

The non-volatile memory 302 is, for example, a rewritable memory of the EEPROM or Flash memory type that can constitute a medium within the meaning of the disclosure, i.e., can include a computer program comprising instructions for implementing the proposed management method. The rewritable memory can include the list L of terminals and data tables used for implementing the disclosure.

This program defines, via its instructions, functional modules of the server that are implemented and/or control the hardware elements described above. FIG. 3*b* is a functional representation of a server according to one embodiment.

These modules notably comprise:

- a reception module 31 configured to receive, from the electronic device, a request REQi to identify at least one user terminal 2 on which an application for managing said electronic device is to be activated;
- a transmission module 33 configured to send at least one identified user terminal a notification request REQn allowing activation of said management application APP on said at least one user terminal 2.

According to embodiments, the identification module 32 can comprise:

- an identification module 32 configured to identify said at least one communication terminal;
- a selection module 321 configured to select an identifier from the list L of terminals; and
- a module 322 for verifying the authorization of said at least one communication terminal to act on the electronic device.

According to one embodiment, the selection module 321 can be configured to determine the terminal or the terminals with the highest signal level.

Furthermore, according to embodiments, the server can comprise a module 34 for polling a data table, from an identifier of the communication terminal identified for verifying its presence in said data table.

The aforementioned modules and means are controlled by the processor of the processing unit 301. They can assume the form of a program that can be executed by a processor, or can assume the form of hardware, such as a specialized integrated circuit (known as an ASIC "Application-Specific Integrated Circuit), a System on Chip (SoC), or an electronic component of the programmable logic circuit type, such as an FPGA ("Field-Programmable Gate Array") type component.

The electronic device 1 and the user terminals 2 comprise modules similar to those described with reference to FIG. 3*a* for the server 3. In particular, they comprise a communication bus, to which the following are connected: a processing unit or microprocessor, a non-volatile memory, a random-access memory or RAM, and a communication interface notably adapted to exchange data with the server and the electronic device.

More specifically, the electronic device 1 comprises the modules required for implementing the method for activating a management application installed in a communication terminal 2. It thus can comprise, according to embodiments:

- a transmission module configured to transmit, to a server, a request to identify at least one user terminal on which the application for managing the electronic device is to be activated; and
- a module for interacting with a user configured to receive an action of the user, with the response to said action being the transmission of the request to identify said at least one user terminal;
- a detection module configured to detect the user terminals connected to the electronic device;
- a module for determining the level of signals received from the connected user terminals (RSSI value); and
- modules configured to generate a list of connected user terminals, called preliminary list of terminals, for selecting terminals from among the terminals of the preliminary list in order to form a new list of terminals, and for transmitting a list of terminals to another equipment, for example, to a server.

The electronic device further comprises an input/output interface, for example, keys or buttons, a screen, a keyboard, a mouse or another pointing device, such as a touch screen or a remote control allowing a user to interact with the electronic device via a graphical interface or a human-machine interface. The user can, for example, perform an action on a button so that the application for managing the electronic device is activated on their terminal.

With respect to the communication terminal 2, it comprises a module for receiving a notification request REQn from the server 3. It further comprises an input/output interface, for example, keys or buttons, a screen, a keyboard, a mouse or another pointing device, such as a touch screen or a remote control allowing a user to interact with the terminal via a graphical interface or a human-machine interface. Thus, according to one embodiment, the user can activate the management application by acting on the received notification.

Thus, by virtue of the disclosure, the terminal of the user who has performed an action on the electronic device is identified, with this identification being implemented without having to add specific modules intended for identifying the terminal. Indeed, in order to implement identification, the electronic device uses the modules used to communicate with the terminals. Furthermore, identifying the communication terminal is implemented without the user of the terminal having to perform any particular action dedicated to identifying or detecting their communication terminal, with the user experience being very positive.

Moreover, this identification is implemented while several terminals are connected to the electronic device and while these terminals are installed with the management application. By virtue of the disclosure, only the terminal of the user who interacted with the electronic device, and consequently located closest to the electronic device, receives a notification intended to activate the application. The other users are not disturbed by a notification allowing activation of the management application or by an untimely activation of the management application.

According to some embodiments, several terminals can be identified as being the terminals to be notified. This is the case, for example, for several terminals located in the vicinity of the electronic device, at a similar distance, or even when it has been predefined that several terminals (a predetermined number of terminals) located closest to the electronic device are the terminals to be notified. According to a particular embodiment, when the administrator user terminal is among the several terminals to be notified, only the administrator user terminal is notified, i.e., receives the notification request from the server.

The invention claimed is:

1. A management method comprising:

managing an electronic device configured to communicate with at least one user terminal and at least one server, said managing being implemented by said server and comprising:

receiving, from the electronic device, a request to identify the at least one user terminal;

receiving, from the electronic device, a list of user terminals connected to said electronic device;

identifying the at least one user terminal from the received list of user terminals; and transmitting, to the identified at least one user terminal, a notification request allowing a management application to be activated on said identified at least one user terminal.

2. The management method as claimed in claim 1, wherein the receiving of the identification request is implemented in response to an interaction on said electronic device by a user.

3. The management method as claimed in claim 1, wherein the list of user terminals is generated by said electronic device from a preliminary list comprising identifiers of user terminals connected to the electronic device, with each terminal identifier being associated with information representing a level of a signal received by the electronic device from said user terminal.

4. The management method as claimed in claim 1, wherein transmitting said notification request is preceded by verifying an authorization of said identified at least one user terminal for managing an operation of the electronic device.

5. The management method as claimed in claim 4, wherein verifying the authorization comprises polling a data table from an identifier of said identified at least one user terminal in order to verify presence of said identifier in said data table.

6. A method comprising:

activating an application for managing an electronic device, said application being installed on at least one user terminal, said activating comprising:

transmitting a request to identify the at least one user terminal and a list of user terminals connected to said electronic device, to a server, wherein said transmission of the identification request being implemented in response to an interaction of a user with said electronic device.

7. A server configured to communicate with at least one electronic device and at least one user terminal, the server comprising:

at least one processor; and at least one non-transitory computer readable medium comprising instructions stored thereon which when executed by the at least one processor configure the server to:

receive, from said electronic device, a request to identify the at least one user terminal;

receive, from the electronic device, a list of user terminals connected to said electronic device;

identify the at least one user terminal from the received list of user terminals; and transmit, to the identified at least one identified user terminal, a notification request allowing said management application to be activated on said at least one user terminal.

8. An electronic device configured to communicate with a server and with at least one user terminal comprising an application for managing said electronic device, said electronic device comprising:

at least one processor; and at least one non-transitory computer readable medium comprising instructions stored thereon which when executed by the at least one processor configure the electronic device to:

receive an action of the user, and in response to said action, transmit to the server a request to identify said at least one user terminal and a list of user terminals connected to said electronic device.

9. A user terminal:

at least one processor; and at least one non-transitory computer readable medium comprising instruction stored thereon which when executed by the at least one processor configure the user terminal to:

store an application for managing at least one electronic device on the at least one non-transitory computer readable medium;

receive, from a server, a notification request allowing said management application to be activated, with wherein said notification request being is transmitted by the server following identification of said user terminal from a list of user terminals connected to said electronic device, in response to reception, from said at least one electronic device, of a request to identify the user terminal and said list of user terminals.

10. A non-transitory processor-readable information medium, on which a computer program is stored comprising code instructions for implementing a management method, when the program is executed by a processor of a server, wherein the management method comprises:

managing an electronic device configured to communicate with at least one user terminal and the server, said managing comprising:

receiving, from the electronic device, a request to identify the at least one user terminal;

receiving, from the electronic device, a list of user terminals connected to said electronic device;

identifying the at least one user terminal from the received list of user terminals; and transmitting, to the identified at least one user terminal, a notification request allowing a management application to be activated on the identified at least one user terminal.

* * * * *